(12) United States Patent
Piper et al.

(10) Patent No.: US 11,305,752 B2
(45) Date of Patent: Apr. 19, 2022

(54) METHOD AND APPARATUS FOR EMISSIONS MITIGATION ON A HYBRID VEHICLE

(71) Applicant: GM Global Technology Operations LLC, Detroit, MI (US)

(72) Inventors: Eric D. Piper, Fenton, MI (US); Andrew M. Zettel, Port Moody (CA); Anthony H. Heap, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 334 days.

(21) Appl. No.: 16/671,945

(22) Filed: Nov. 1, 2019

(65) Prior Publication Data

US 2021/0129825 A1    May 6, 2021

(51) Int. Cl.
| | |
|---|---|
| *B60W 20/13* | (2016.01) |
| *B60L 50/60* | (2019.01) |
| *B60L 58/13* | (2019.01) |
| *F02N 11/00* | (2006.01) |
| *F02D 41/02* | (2006.01) |
| *B60W 10/06* | (2006.01) |
| *B60W 10/08* | (2006.01) |

(52) U.S. Cl.
CPC .............. *B60W 20/13* (2016.01); *B60L 50/66* (2019.02); *B60L 58/13* (2019.02); *B60W 10/06* (2013.01); *F02D 41/0255* (2013.01); *F02N 11/00* (2013.01); *B60W 10/08* (2013.01); *B60W 2510/244* (2013.01); *F02D 2200/021* (2013.01); *F02D 2200/101* (2013.01); *F02D 2200/503* (2013.01); *F02N 2200/023* (2013.01)

(58) Field of Classification Search
CPC ...... B60W 20/13; B60W 10/06; B60W 10/08; B60W 2510/244; B60W 2510/246; B60W 2555/20; B60W 2710/0644; B60L 50/66; B60L 58/13; F02D 41/0255; F02D 2200/021; F02D 2200/101; F02D 2200/503; F02D 2200/023; F02N 11/00
See application file for complete search history.

(56) References Cited

U.S. PATENT DOCUMENTS

| | | | |
|---|---|---|---|
| 2011/0320082 A1* | 12/2011 | Ishishita | B60L 50/61 701/22 |
| 2013/0338864 A1* | 12/2013 | Shallvari | B60W 10/06 701/22 |
| 2019/0168741 A1* | 6/2019 | Morisaki | B60W 10/08 |
| 2019/0338697 A1* | 11/2019 | Kelly | F02N 11/04 |
| 2021/0155218 A1* | 5/2021 | Higuchi | B60W 10/26 |

* cited by examiner

*Primary Examiner* — George C Jin
(74) *Attorney, Agent, or Firm* — Vivacqua Crane PLLC

(57) ABSTRACT

A system for emissions mitigation for a hybrid automobile vehicle includes an automobile vehicle provided with motive power from: a battery pack; an engine; and a controller in communication with the battery pack and the engine. A threshold battery pack state-of-charge (SOC) is predetermined. A minimum battery pack SOC is less than the threshold battery pack SOC. An engine-on charge depletion (EOCD) command is issued by the controller to start the engine in an engine-catalyst light-off operation condition when the vehicle is operating using power from the battery pack and when the threshold battery pack state-of-charge (SOC) is reached to mitigate against exceeding vehicle emissions standards.

20 Claims, 2 Drawing Sheets

METHOD AND APPARATUS FOR EMISSIONS MITIGATION ON A HYBRID VEHICLE

INTRODUCTION

The present disclosure relates to hybrid vehicle battery and emissions control systems.

Hybrid vehicles (HVs) derive at least a portion of motive power from a battery provided as a battery pack having multiple individual battery cells. The battery is at a peak capacity when new and may degrade with use and age. HVs may operate solely on battery power, solely on engine power, or using a combination of battery and engine power. When battery power is insufficient to provide motive power, engine operation may be necessary. Engine operation generates multiple pollutants, one of which are particulate emissions, many of which are regulated by government standards. Several pollutants are commonly controlled using a catalyst. Cold start engine emissions reduction strategies exist for these pollutants, however certain particulates cannot be reduced or eliminated by efficient catalyst operation. Particulate filters are therefore utilized for soot removal, however particulate filters require space, add weight and incur additional design and installation cost. On gasoline fueled vehicles, the expedient warm up of the catalyst at the beginning of the engine operating cycle is known as catalyst light-off. In general, these strategies utilize a combination of elevated engine speed and retarded spark timing to direct fuel energy to the catalyst as opposed to engine torque.

As an HV battery ages it loses power and energy during an emissions compliance window. In a partial hybrid electric vehicle (PHEV) application this may cause excessive emissions because the PHEV and the battery cannot operate the same as at the beginning of battery life. This may result in failure of in-use government emissions cycle testing. In addition, output torque must be maintained to drive the cycle, therefore the options of solely limiting PHEV operation to engine operation or allowing an over-depletion of the HV battery to obtain output torque are not acceptable solutions to loss of HV battery power. To limit loss of HV battery power, particular attention has been given to various aspects of maintaining a battery pack state-of-charge (SOC). The SOC is defined generally as a ratio of a residual charge in a battery relative to its full charge capacity. It has been found that limiting a battery SOC range to provide more charge sustaining energy may also prevent meeting the electric vehicle (EV) range requirements.

Thus, while current HV battery systems achieve their intended purpose, there is a need for a new and improved system and method for emissions mitigation on a hybrid electric vehicle (HEV).

SUMMARY

According to several aspects, a system for emissions mitigation for a hybrid automobile vehicle includes an automobile vehicle provided with motive power from a battery pack and an engine. A threshold battery pack state-of-charge (SOC) is predetermined. An engine-on charge depletion (EOCD) command is issued to start the engine in a light operating condition defining an engine-catalyst light-off operation when the vehicle is operating using power from the battery pack and when the threshold battery pack state-of-charge (SOC) is reached to mitigate against exceeding vehicle emissions standards.

In another aspect of the present disclosure, the battery pack has a minimum battery pack SOC less than the threshold battery pack SOC.

In another aspect of the present disclosure, the minimum battery pack SOC is approximately 16% SOC.

In another aspect of the present disclosure, the threshold battery pack state-of-charge (SOC) is approximately 25% SOC.

In another aspect of the present disclosure, an engine controller is included. The engine controller collects data including an ambient temperature, battery capability changes and a battery pack SOC, and stores predetermined values for a minimum threshold temperature $T_1$ and the threshold battery pack state-of-charge (SOC).

In another aspect of the present disclosure, the engine controller includes a command signal generator to signal automatic start and stop of the engine.

In another aspect of the present disclosure, an engine-catalyst light-off operation condition defines an engine speed ranging between an idle rpm up to approximately 1500 rpm.

In another aspect of the present disclosure, a time period for operating at the engine-catalyst light-off operation condition is approximately two minutes.

In another aspect of the present disclosure, a minimum limit for operation at the engine-catalyst light-off operation condition is until a minimum threshold temperature of the engine of approximately 60 degrees C. is reached.

In another aspect of the present disclosure, a charge depletion/charge sustaining (CD-CS) transition point $P_1$ of the battery pack of approximately 16% SOC defining a minimum battery pack SOC for battery pack use.

According to several aspects, a system for emissions mitigation for a hybrid automobile vehicle includes an automobile vehicle provided with motive power from: a battery pack; an engine; and a controller in communication with the battery pack and the engine. A threshold battery pack state-of-charge (SOC) is predetermined. A minimum battery pack SOC is less than the threshold battery pack SOC. An engine-on charge depletion (EOCD) command is issued by the controller to start the engine in an engine-catalyst light-off operation condition when the vehicle is operating using power from the battery pack and when the threshold battery pack state-of-charge (SOC) is reached to mitigate against exceeding vehicle emissions standards.

In another aspect of the present disclosure, a minimum threshold temperature of the engine is approximately 60 degrees C. wherein upon the engine achieving the minimum threshold temperature the light or engine-catalyst light-off operation condition is discontinued.

In another aspect of the present disclosure, a cold start emissions reduction (CSER) is complete when the engine achieves the minimum threshold temperature.

In another aspect of the present disclosure, a charge sustaining operation of the automobile vehicle wherein greenhouse gas emissions and soot do not exceed emission standards is available when the engine becomes a primary energy source.

In another aspect of the present disclosure, a temperature sensor measures an engine coolant temperature to identify the minimum threshold temperature.

In another aspect of the present disclosure, the minimum pack SOC defines a charge-depletion/charge-sustaining (CD-CS) transition point $P_1$ where transition from vehicle powered operation using the battery pack is changed to vehicle powered operation using the engine.

In another aspect of the present disclosure, the minimum battery pack SOC is approximately 16% SOC; and the threshold battery pack state-of-charge (SOC) ranges from approximately 20% up to approximately 35% inclusive.

According to several aspects, a method of operating a system for emissions mitigation for a hybrid automobile vehicle includes: measuring battery metrics of a battery pack during operation of the automobile vehicle using power of the battery pack; confirming if a capability reduction of the battery pack has occurred; if a response to the confirming step is YES indicating a capability reduction of the battery pack has occurred, identifying an SOC transition point and an adjusted SOC transition point defining a threshold battery pack SOC; automatically starting the engine when the threshold battery pack SOC is reached before a charge-depletion/charge-sustaining transition point defining the SOC transition point is reached; and operating the engine until the engine reaches a predetermined minimum threshold temperature.

In another aspect of the present disclosure, the method further includes: selecting the threshold battery pack state-of-charge (SOC) of approximately 25% defining an adjusted SOC transition point; and transitioning from operation of the automobile vehicle using power of the battery pack to operation of the automobile vehicle using power of the engine when the adjusted SOC transition point is reached. This aspect can also be known as a "preemptive engine start".

In another aspect of the present disclosure, the method further includes performing a run-normal cold start emissions reduction (CSER) catalyst light-off (CLO) with the engine operated in a light-off operation mode including limiting an engine speed between an idle rpm speed and approximately 1500 rpm until the engine reaches a predetermined minimum threshold temperature.

In another aspect of the present disclosure, the method further includes ensuring that while the engine is under operation, constraints are placed on an amount of engine power produced during the engine-catalyst light-off operation to minimize fuel throughput and an amount of pollutant generated.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
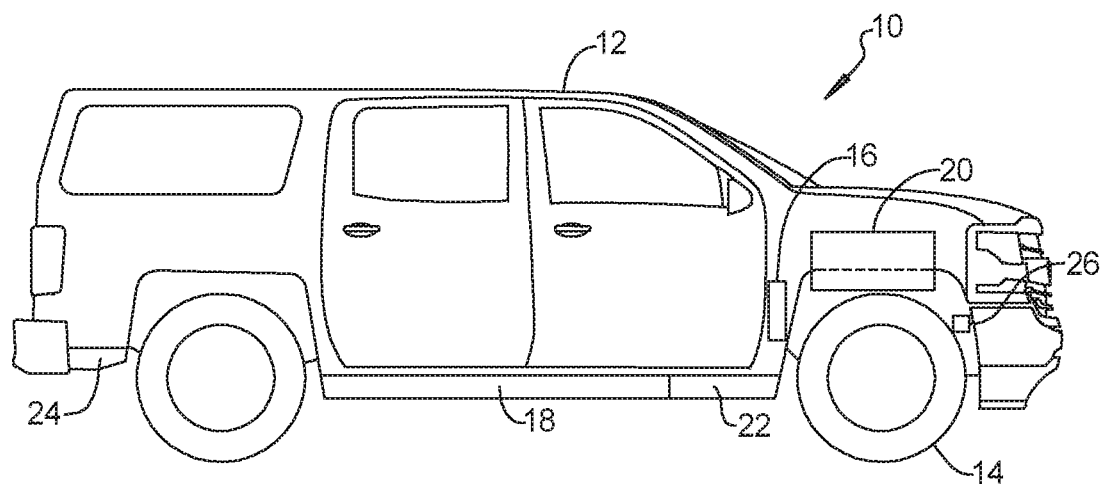
FIG. 1 is a side elevational partial cross-sectional view of an automobile vehicle having a system for emissions mitigation for a hybrid vehicle according to an exemplary aspect.

Referring to FIG. 1, a system for emissions mitigation for a hybrid automobile vehicle 10 includes an apparatus for emissions mitigation on a hybrid vehicle 12. The hybrid vehicle (HV) 12 includes at least one driven wheel 14 which is rotated by operation of an electric motor 16. Motive power for operation of the electric motor 16 may be provided by a battery pack 18 having multiple battery cells and may be supplemented with power from an engine 20 such as a gasoline engine or a diesel engine. According to several aspects, power may also be distributed between the battery pack 18 and the engine 20 using a transmission 22 providing multiple gear ratios.

To maximize operating economy and minimize fuel consumption it is anticipated to operate the HV 12 using power from the battery pack 18 to a maximum extent. In addition, operation of the engine 20 generates greenhouse gases and particulates including soot. Greenhouse gases can be mitigated using a catalytic converter 24 as known, yet particulates such as soot cannot be removed using the catalytic converter 24. Production of soot is highest when the engine 20 initially starts with the engine cold (ambient temperature), the engine valves and cylinders are cold and therefore before an engine operating temperature is able to permit full evaporation of the fuel, thereby resulting in an incomplete fuel burn.

When the HV 12 is operating using power from the battery pack 18, battery power will be reduced. This power reduction is exacerbated at extended battery pack life and when ambient temperature approaches a coldest ambient temperature of approximately −40 degrees F. It is anticipated to avoid battery pack depletion by initiating operation of the engine 20 before the battery pack 18 reaches a minimum battery pack state-of-charge (SOC). The SOC is defined as a ratio of a residual charge in the battery pack 18 relative to a full battery pack charge capacity. According to several aspects the minimum battery pack SOC may be approximately 16% SOC, and this value can vary above or below 16% SOC.

An engine-on charge depletion (EOCD) command may be issued to energize vehicle cabin heaters and as described below to mitigate against exceeding vehicle emissions standards when a threshold battery pack SOC is reached which is above the minimum battery pack SOC. In response to the EOCD command the engine 20 is started while power continues to be withdrawn from the battery pack 18. It is noted that it is undesirable after initiating operation of the engine 20 to immediately demand power output from the engine 20 due to the likelihood of soot production and other emissions because the engine 20 may initially be at ambient temperature conditions. Particulate emissions can also occur at levels higher than the standard if too much power is demanded from the engine 20 to meet the drive cycle or to recharge the battery pack 18.

The present disclosure therefore provides a methodology that identifies and applies the predetermined threshold battery pack SOC which is above the minimum battery pack SOC to schedule when to generate the engine-on charge depletion (EOCD) command. Currently, EOCD operation is primarily used for heater performance in winter-time charge depletion operation, to heat an engine coolant for vehicle cabin comfort. The present system for emissions mitigation for a hybrid automobile vehicle 10 further purposes the EOCD operation as an "engine block warming feature" and determines how to change from a battery discharge to a battery charge sustaining level prior to the battery pack reaching the minimum battery pack SOC by generating heat using an engine-catalyst light-off operation condition which is defined below. This method uses battery pack capacity and/or similar battery metrics and utilizes an operating system logic to lightly run the engine 20 before the battery pack SOC reaches the minimum battery pack SOC defining a charge-depletion/charge-sustaining (CD-CS) transition point $P_1$. The goal is to achieve a cold start emissions reduction (CSER) completion and an engine block/intake temperature which is at or above a predetermined minimum threshold temperature $T_1$ such that greenhouse gas emissions and soot do not exceed emission standards when the engine 20 becomes the primary energy source during charge sustaining operation of the HV 12.

An additional phase of cold start emissions reduction is provided which minimizes fuel mass to minimize engine-out engine particulate number ($P_N$) emissions. Particulates such as soot are reduced as a function of how warm the engine 20 (intake heads, cylinder walls) are, and not as a function of a temperature of the catalytic converter 24 catalyst. It is noted a time to heat the catalytic converter catalyst to an efficient operation temperature is shorter than a time to generate engine block heat. The factors to allow for engine block warming to achieve $P_N$ emissions reduction and other emissions reductions are sometimes not linked.

According to several aspects, the system for emissions mitigation for a hybrid automobile vehicle 10 automatically initiates operation of the engine 20 at a threshold battery pack state-of-charge (SOC) of approximately 25%. The engine 20 is automatically started in an engine-catalyst light-off or "light" engine operation condition, defined herein as a no-load condition of the engine 20, for example operation ranging from an idle rpm of approximately 700 rpm to 1100 rpm up to an engine speed of approximately 1500 rpm. This allows the engine 20 to warm-up from an ambient temperature to the engine block predetermined minimum threshold temperature $T_1$ of approximately 60 degrees C. before a load is applied on the engine 20. According to several aspects, the 60 degrees C. temperature applied as the engine block temperature defines an engine coolant temperature measured using a temperature sensor, and can vary above and below 60 degrees C. for different engine designs. It is anticipated a time of approximately 2 minutes of "light" engine operation will achieve the engine block predetermined minimum threshold temperature $T_1$ of approximately 60 degrees C. above which greenhouse gas and soot emissions meet the emissions standards and therefore defines a minimum limit for operation at the engine-catalyst light-off operation condition. The threshold battery pack state-of-charge (SOC) of approximately 25% is vehicle dependent and can vary within the scope of the present disclosure and can range from an SOC of approximately 20% up to an SOC of approximately 35% inclusive.

After "light" engine operation is completed, the engine 20 has achieved an engine block temperature which is at or above the predetermined minimum threshold temperature $T_1$ of approximately 60 degrees C. This permits the engine 20 to then be operated as the primary energy source during charge sustaining operation of the HV 12 and greenhouse gas emissions and soot do not exceed emission standards. When the minimum threshold temperature $T_1$ is reached, if there is no further engine demand for charge sustaining operation of the HV 12 present or if there is no further engine demand, the engine 20 may be automatically shut down and will act as a thermal reservoir exceeding or sustaining the predetermined minimum threshold temperature $T_1$ for a time period or until a next point of operation when the HV 12 reaches the threshold battery pack state-of-charge (SOC) point $P_1$ of approximately 25%.

An engine controller 26 collects data such as ambient temperature, battery capability changes and SOC, and stores predetermined values for the minimum threshold temperature $T_1$, the threshold battery pack state-of-charge (SOC) and the SOC transition point $P_1$ discussed in greater detail below. The engine controller 26 includes a command signal generator and generates command signals to automatically start and stop the engine 20, monitors engine temperature, and tracks a time of engine operation when the predetermined minimum threshold temperature $T_1$ is achieved.

Referring to FIG. 2 and again to FIG. 1, a method for operating the system for emissions mitigation for a hybrid automobile vehicle 10 includes in a first step 28 measuring battery metrics of the battery pack 18. In a second step 30 based on the battery metrics a determination is made if a capability reduction of the battery pack 18 has occurred. If a response to the second step 30 is NO indicating a capability reduction of the battery pack 18 has not occurred, in a third step 32 a CD-CS transition point $P_1$ at a predefined beginning-of-life (BOL) target for a cold start is executed. In a fourth step 34 a run-normal CSER catalyst light-off (CLO) is then performed. In a fifth step 36 the engine 20 is run normally in a charge-sustaining (CS) mode.

Figure 2:
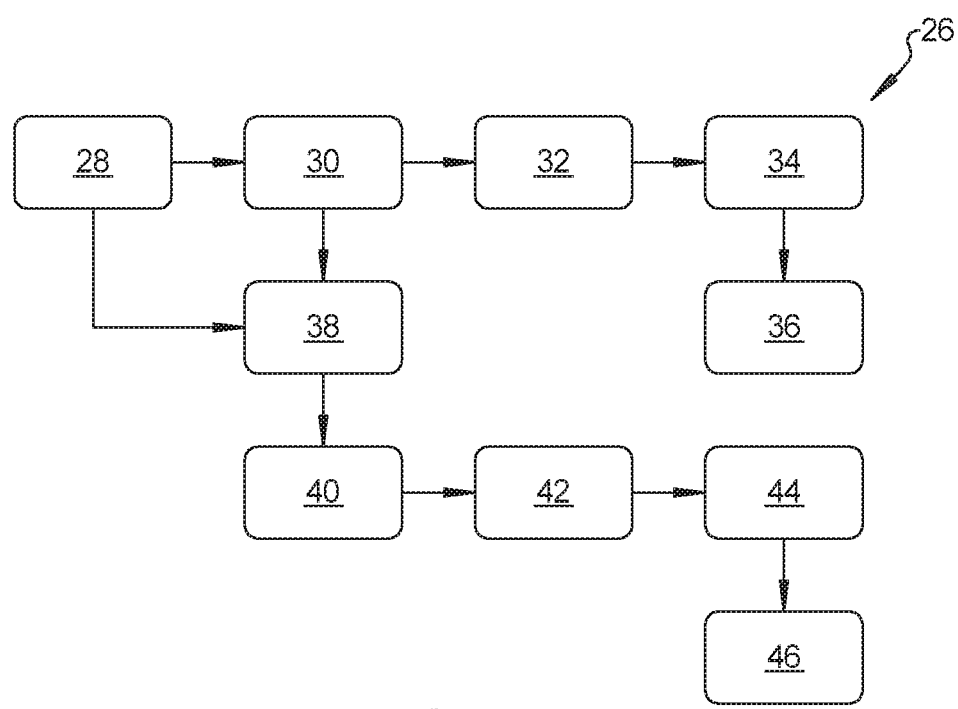
FIG. 2 is a flow diagram of method steps for using the system of FIG. 1.

With continuing reference to FIG. 2, if a response to the second step 30 is YES indicating a capability reduction of the battery pack 18 has occurred, in a sixth step 38 the SOC transition point $P_1$ is identified, and an adjusted SOC transition point $P_2$ defining the threshold battery pack SOC is generated. In a seventh step 409 the engine 20 is automatically turned on before the CD-CS transition point $P_1$ of 16% is reached, for example at the threshold battery pack state-of-charge (SOC) of approximately 25% defining the adjusted SOC transition point $P_2$. In an eighth step 42 a run-normal CSER catalyst light-off (CLO) is then performed with the engine 20 operated in the "light" mode. In a ninth step 44 the engine 20 is continued to be operated in the "light" mode until the SOC reaches a predetermined battery charge-sustaining (CS) state. In a tenth step 46 the engine 20 is maintained in operation in the battery CS state.

Figure 3:
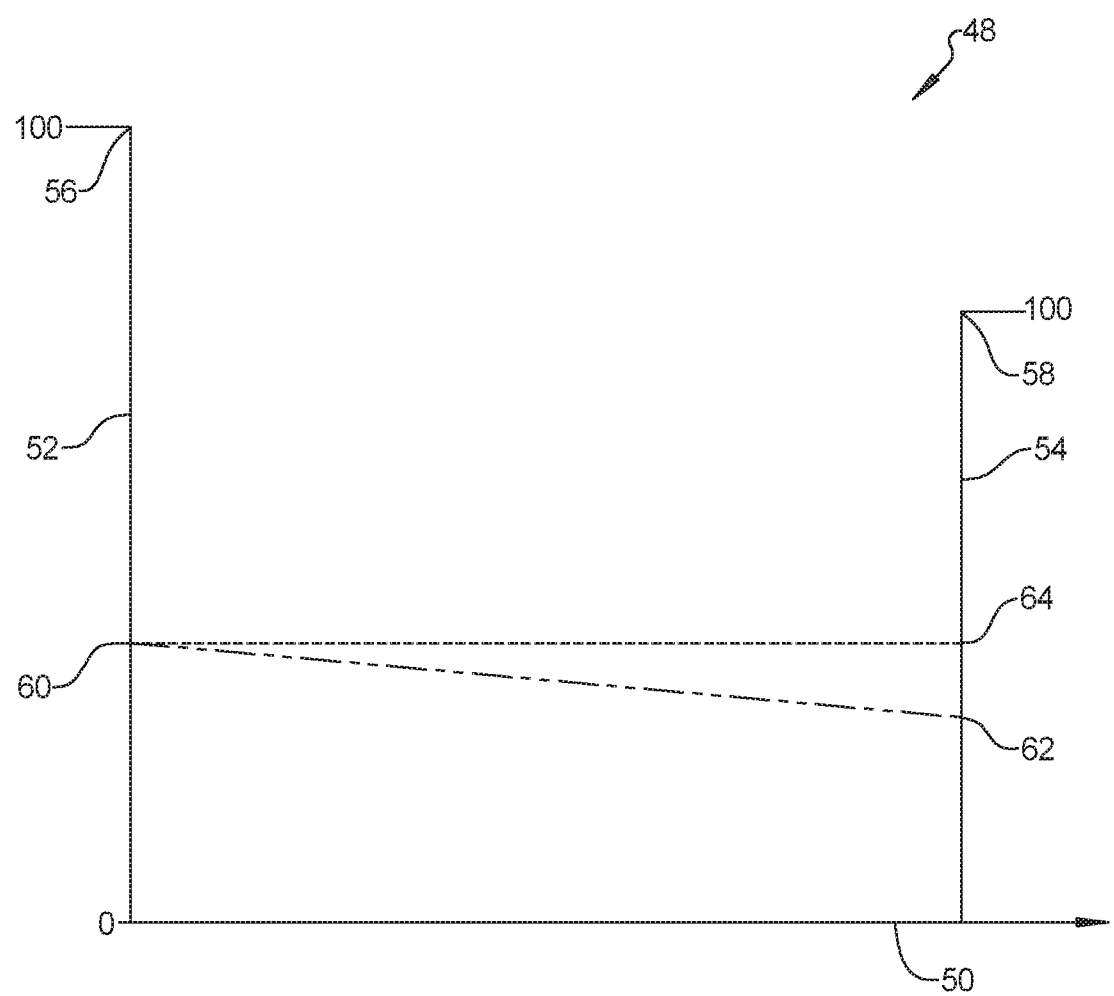
FIG. 3 is a graph presenting battery metrics over time identifying a battery pack energy at a beginning-of-life (BOL) compared to a battery pack energy at an end-of-life (EOL).

Referring to FIG. 3 and again to FIG. 2, a graph 48 identifies exemplary battery metrics over time 50 used to identify how the adjusted SOC transition point $P_2$ is generated. The graph 48 includes a first abscissa 52 representing a battery pack 18 energy at a beginning-of-life (BOL) compared to a second abscissa 54 representing the battery pack 18 energy at an end-of-life (EOL). The maximum available (100%) units of energy 56 at the BOL is greater than the maximum available (100%) units of energy 58 at the EOL, therefore the initial CD-CS transition point $P_1$ at a position 60 on the first abscissa 52 representing 16% SOC is reduced to a position 62 on the second abscissa 54. To maintain a similar margin of SOC at the EOL the adjusted SOC transition point $P_2$ at a position 64 is selected.

A system for emissions mitigation for a hybrid automobile vehicle including a partial hybrid vehicle of the present disclosure offers several advantages. These include monitoring and employing a reduced battery capability/capacity over time which is linked to a proactive engine-on decision before an expected CD-CS transition occurs. The system automatically starts a vehicle engine when a predetermined SOC threshold is reached. The system allows the automobile vehicle engine to warm-up under a no-load or idle condition defining a light operating condition for several minutes and not exceed emissions standards prior to transitioning to a charge sustaining operation. Use of the system obviates the need for and use of a particulate filter used for soot removal.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An emissions mitigation system of a hybrid automobile vehicle, comprising:
   an automobile vehicle provided with motive power from:
      a battery pack; and
      an engine;
   a predetermined threshold battery pack state-of-charge (SOC); and
   an engine-on charge depletion (EOCD) command issued to start the engine in an engine-catalyst light-off operation condition when the automobile vehicle is operating using power from the battery pack and when the threshold battery pack state-of-charge (SOC) is reached to mitigate against exceeding vehicle emissions standards.

2. The emissions mitigation system of a hybrid automobile vehicle of claim 1, wherein the battery pack has a minimum battery pack SOC less than the threshold battery pack SOC.

3. The emissions mitigation system of a hybrid automobile vehicle of claim 2, wherein the minimum battery pack SOC is approximately 16% SOC.

4. The emissions mitigation system of a hybrid automobile vehicle of claim 3, wherein the threshold battery pack state-of-charge (SOC) is approximately 25% SOC.

5. The emissions mitigation system of a hybrid automobile vehicle of claim 1, further including an engine controller, the engine controller collecting data including an ambient temperature, battery capability changes and a battery pack SOC, and storing predetermined values for a minimum threshold temperature $T_1$ and the threshold battery pack state-of-charge (SOC).

6. The emissions mitigation system of a hybrid automobile vehicle of claim 5, wherein the engine controller includes a command signal generator to signal automatic start and stop of the engine.

7. The emissions mitigation system of a hybrid automobile vehicle of claim 1, wherein the engine-catalyst light-off operation condition defines an engine speed ranging between an idle rpm up to approximately 1500 rpm.

8. The emissions mitigation system of a hybrid automobile vehicle of claim 1, wherein a time period to operate at the engine-catalyst light-off operation condition is approximately two minutes.

9. The emissions mitigation system of a hybrid automobile vehicle of claim 1, wherein a minimum limit for operation at the engine-catalyst light-off operation condition is until an engine minimum threshold temperature of approximately 60 degrees C. is reached.

10. The emissions mitigation system of a hybrid automobile vehicle of claim 1, further including a charge depletion/charge sustaining (CD-CS) transition point $P_1$ of the battery pack of approximately 16% SOC defining a minimum battery pack SOC for battery pack use.

11. A emissions mitigation system of a hybrid automobile vehicle, comprising:
   an automobile vehicle provided with motive power from:
      a battery pack;
      an engine; and
      a controller in communication with the battery pack and the engine;
   a predetermined threshold battery pack state-of-charge (SOC);
   a minimum battery pack SOC less than the threshold battery pack SOC; and
   an engine-on charge depletion (EOCD) command issued by the controller to start the engine in an engine-catalyst light-off operation condition when the automobile vehicle is operating using power from the battery pack and when the threshold battery pack state-of-charge (SOC) is reached to mitigate against exceeding vehicle emissions standards.

12. The emissions mitigation system of a hybrid automobile vehicle of claim 11, further including a minimum engine threshold temperature of approximately 60 degrees C. wherein upon achieving the minimum engine threshold temperature the engine-catalyst light-off operation condition is discontinued.

13. The emissions mitigation system of a hybrid automobile vehicle of claim 12, wherein a cold start emissions reduction (CSER) is complete when the engine achieves the minimum engine threshold temperature.

14. The emissions mitigation system of a hybrid automobile vehicle of claim 13, further including a charge sustaining operation of the automobile vehicle wherein greenhouse gas emissions and soot do not exceed emission standards when the engine becomes a primary energy source.

15. The emissions mitigation system of a hybrid automobile vehicle of claim 12, further including a temperature sensor measuring an engine coolant temperature to identify the minimum engine threshold temperature.

16. The emissions mitigation system of a hybrid automobile vehicle of claim 11, wherein the minimum battery pack SOC defines a charge-depletion/charge-sustaining (CD-CS) transition point $P_1$ where transition from vehicle powered operation using the battery pack is changed to vehicle powered operation using the engine.

17. The emissions mitigation system of a hybrid automobile vehicle of claim 11, wherein:
   the minimum battery pack SOC is approximately 16% SOC; and
   the threshold battery pack state-of-charge (SOC) ranges from approximately 20% up to approximately 35% inclusive.

18. A method of operating an emissions mitigation system of a hybrid automobile vehicle, comprising:
   measuring battery metrics of a battery pack during operation of the automobile vehicle using power of the battery pack;
   confirming if a capability reduction of the battery pack has occurred;
   if a response to the confirming step is YES indicating a capability reduction of the battery pack has occurred, identifying a state-of-charge (SOC) transition point and an adjusted SOC transition point defining a threshold battery pack SOC;
   automatically starting an engine when the threshold battery pack SOC is reached before a charge-depletion/charge-sustaining transition point defining the SOC transition point is reached; and
   operating the engine "shielded" defined as the engine not supporting a vehicle load demand until the engine reaches a predetermined minimum threshold temperature.

19. The method of operating the emissions mitigation system of a hybrid automobile vehicle of claim 18, further including:

selecting the threshold battery pack state-of-charge (SOC) of approximately 25% defining an adjusted SOC transition point; and transitioning from operation of the automobile vehicle using power of the battery pack to operation of the automobile vehicle using power of the engine when the adjusted SOC transition point is reached.

20. The method of operating the emissions mitigation system of a hybrid automobile vehicle of claim 19, further including performing a cold start emissions reduction (CSER) catalyst light-off (CLO) with the engine operated in a light operation mode including limiting an engine speed between an idle rpm speed and approximately 1500 rpm until the engine reaches a predetermined minimum threshold temperature.

* * * * *